US012790020B2

(12) United States Patent
Bill et al.

(10) Patent No.: US 12,790,020 B2

(45) Date of Patent: Nov. 10, 2026

(54) METHOD AND CONTROLLER FOR AN AIRCRAFT

(71) Applicant: Airbus Operations Limited, Filton (GB)

(72) Inventors: Andrew Bill, Filton (GB); Michael Orford, Filton (GB)

(73) Assignee: Airbus Operations Limited, Filton (GB)

(*) Notice: Subject to any disclaimer, the term of this patent is extended or adjusted under 35 U.S.C. 154(b) by 127 days.

(21) Appl. No.: 18/883,294

(22) Filed: Sep. 12, 2024

(65) Prior Publication Data

US 2025/0091725 A1 Mar. 20, 2025

(30) Foreign Application Priority Data

Sep. 15, 2023 (GB) .................................... 2314143

(51) Int. Cl.

*B64D 45/00* (2006.01)
*B64C 25/34* (2006.01)
*B64C 25/42* (2006.01)

(52) U.S. Cl.

CPC .......... *B64D 45/0005* (2013.01); *B64C 25/34* (2013.01); *B64C 25/426* (2013.01)

(58) Field of Classification Search

CPC .... B64D 45/0005; B64C 25/34; B64C 25/426
See application file for complete search history.

(56) References Cited

U.S. PATENT DOCUMENTS

| | | | | |
|---|---|---|---|---|
| 7,945,422 | B2 | 5/2011 | Vetsch | |
| 2006/0069477 | A1* | 3/2006 | Nahapetian | G07C 5/0808 701/3 |
| 2008/0033607 | A1* | 2/2008 | Zeliff | B64D 45/0005 701/31.4 |
| 2015/0002318 | A1* | 1/2015 | Cahill | B64D 45/00 340/960 |
| 2016/0052623 | A1* | 2/2016 | Elliott | B64C 25/18 244/102 R |

(Continued)

FOREIGN PATENT DOCUMENTS

| | | | |
|---|---|---|---|
| CN | 214010647 U | * | 8/2021 |
| CN | 116394683 A | | 7/2023 |

(Continued)

OTHER PUBLICATIONS

United Kingdom Search Report for corresponding United Kingdom Patent Application No. 2314143.5 dated Mar. 5, 2024.

*Primary Examiner* — Justin S Lee

(74) *Attorney, Agent, or Firm* — Greer, Burns & Crain, Ltd.

(57) ABSTRACT

A computer-implemented method comprising determining, on the basis of a change in pressure in a tire of a wheel of an aircraft, whether a transition between Weight on Wheels and Weight off Wheels has occurred at the wheel. Also disclosed is a system for an aircraft, the system comprising a tire pressure monitoring system configured to detect pressure in a tire of a wheel of the aircraft and output a signal indicative of the pressure detected, and a controller configured to receive the signal and determine, on the basis of the signal, whether a transition between Weight on Wheels and Weight off Wheels has occurred at the wheel.

20 Claims, 9 Drawing Sheets

(56) References Cited

U.S. PATENT DOCUMENTS

| | | | | |
|---|---|---|---|---|
| 2017/0096037 | A1* | 4/2017 | Smith | B60C 23/0488 |
| 2017/0166328 | A1* | 6/2017 | Ethington | G06Q 10/20 |
| 2017/0322069 | A1* | 11/2017 | Mastrianni | B64C 25/001 |
| 2021/0101423 | A1 | 4/2021 | Bill | |

FOREIGN PATENT DOCUMENTS

| | | | | | |
|---|---|---|---|---|---|
| EP | 2208971 | A1 | | 7/2010 | |
| FR | 3111846 | A1 | * | 12/2021 | B60C 23/0408 |
| GB | 2611086 | A | * | 3/2023 | G01G 19/07 |
| GB | 2614881 | A | | 7/2023 | |
| GB | 2623795 | A | | 5/2024 | |

* cited by examiner

METHOD AND CONTROLLER FOR AN AIRCRAFT

CROSS-REFERENCES TO RELATED APPLICATIONS

This application claims the benefit of Great Britain Patent Application Number 2314143.5 filed on Sep. 15, 2023, the entire disclosure of which is incorporated herein by way of reference.

FIELD OF THE INVENTION

The present invention relates to detecting a transition between Weight on Wheels and Weight off Wheels for an aircraft.

BACKGROUND OF THE INVENTION

Weight on Wheels or Weight off Wheels indicate whether an aircraft's weight is being supported by the wheels of the aircraft or not. When the aircraft is on the ground, the aircraft has a Weight on Wheels status. When the aircraft is airborne, the aircraft has a Weight off Wheels status. An accurate Weight on Wheels or Weight off Wheels indication is important for aircraft operation. For example, an inaccurate or false indication of Weight on Wheels or Weight off Wheels may adversely impact other aircraft systems that function dependent on a Weight on Wheels or Weight off Wheels status.

SUMMARY OF THE INVENTION

A first aspect of the present invention provides a computer-implemented method comprising determining, on the basis of a change in pressure in a tire of a wheel of an aircraft, whether a transition between Weight on Wheels and Weight off Wheels has occurred at the wheel.

Some methods for determining whether a transition between Weight on Wheels and Weight off Wheels has occurred may be proximity-based, in which a distance is measured between a predefined point on the aircraft and the ground. Such proximity-based methods may lead to non-binary indications such as partial Weight on Wheels or Weight off Wheels. Non-binary indications may be unsuitable for aircraft systems which require a clear binary indication of Weight on Wheels or Weight off Wheels to function. Other methods for determining whether a transition between Weight on Wheels and Weight off Wheels has occurred may be mechanical based, in which movement of two aircraft components relative to one another is detected, the movement being indicative of a change in load supported by a wheel of the aircraft, or a landing gear of the aircraft. Examples of mechanical methods include determining a transition between Weight on Wheels and Weight off Wheels on the basis of a change in length of a strut of a landing gear of the aircraft, or a change in wheel speed of a wheel of the aircraft. Such mechanical methods may be less reliable than proximity-based methods, for example due to icy or wet runway conditions or stiction between the two aircraft components, which may result in a delay to detecting a transition between Weight on Wheels and Weight off Wheels.

It has been found that a change in tire pressure may accurately indicate a transition between Weight on Wheels and Weight off Wheels in real-time. As compression of the tire changes due to the wheel transitioning between being airborne and being on the ground, a corresponding and substantially simultaneous change in pressure in the tire may be observed. This may offer an improvement over the aforementioned existing methods for determining whether a transition between Weight on Wheels and Weight off Wheels has occurred at a wheel, in terms of a speed and reliability of the determining. In turn, aircraft systems that depend on an indication of Weight on Wheels or Weight off Wheels to function may be employed sooner after the transition between Weight on Wheels and Weight off Wheels has occurred compared to other methods for determining whether a transition between Weight on Wheels and Weight off Wheels has occurred, leading to a reduction in latency for operation of such aircraft systems.

Optionally, the method comprises: measuring, with a tire pressure sensor, pressure in the tire; transmitting a signal indicative of the tire pressure measured; and performing the determination on the basis of the signal. Existing aircraft may already comprise a pressure sensor suitable for measuring pressure in the tire. Accordingly, a processor capable of implementing the method may be easily retrofitted to existing aircraft without a need for additional hardware.

Optionally, the determining comprises determining that a transition from Weight on Wheels to Weight off Wheels has occurred at the wheel on the basis of a decrease in pressure in the tire. The method may thus be used to determine that the wheel has transitioned from being in contact with the ground to being airborne. It has been found that transition of a wheel from being in contact with the ground to being airborne causes a rapid and relatively large decrease in pressure in the tire, compared to typical pressure fluctuations that occur an aircraft take-off event, as compression of the tire reduces due to a decrease in load supported by the wheel. Detecting such a rapid decrease in pressure in the tire may permit determination of a transition from Weight on Wheels to Weight off Wheels.

Optionally, the determining comprises determining that a transition from Weight off Wheels to Weight on Wheels has occurred on the basis of an increase in pressure in the tire. The method may thus be used to determine that the wheel has transitioned from being airborne to being in contact with the ground. As a wheel transitions from being airborne to being in contact with the ground, load supported by the wheel may increase, which may increase compression of the tire and thus increase pressure in the tire. It has been found that positive contact between the tire and the ground may cause a rapid and relatively large increase in pressure in the tire, compared to typical pressure fluctuations that occur at other times during an aircraft landing event, and that detecting such a rapid increase in pressure in the tire may permit determination of a transition from Weight off Wheels to Weight on Wheels.

Optionally, the method comprises determining whether a transition between Weight on Wheels and Weight off Wheels has occurred at the wheel on the basis of pressure in the tire changing by at least threshold pressure within a threshold time period. Optionally, the threshold pressure may be at least a 2% change in pressure in the tire and the threshold time period may be 0.5 seconds. Optionally, the threshold pressure may be at least a 4% change in pressure in the tire. Optionally, the threshold time period may be 0.4 seconds.

Optionally, the method comprises determining that the change in pressure occurs during an aircraft take-off or landing event. The aircraft take-off or landing event may be determined on the basis of one or more operational parameters of the aircraft. For example, on the basis of one or more of: an altitude of the aircraft, a rotational speed of the wheel, a position of a landing gear of the aircraft and a speed of the aircraft.

Optionally, the method comprises, in response to determining that a transition from Weight on Wheels to Weight off Wheels has occurred at the wheel, causing a landing gear control system of the aircraft to initiate retraction of a landing gear comprising the landing gear wheel. This may result in earlier retraction of the landing gear after the landing gear transitions to Weight off Wheels, compared to retraction of the landing gear being initiated on the basis of another aircraft criterion such as positive climb rate of the aircraft. This may permit initiation of retraction of a nose landing gear of the aircraft prior to initiation of retraction of a main landing gear, aft of the nose landing gear, for example during rotation of the aircraft (in which the nose landing gear is not in contact with the ground and the main landing gear is in contact with the ground) during an aircraft take-off event. The method may comprise causing the landing gear control system to perform only a portion of a landing gear retraction sequence for retracting the landing gear. Authority for performing a remainder of the landing gear retraction sequence may be maintained by flight crew of the aircraft, or may be initiated on the basis of determining that another criterion, unrelated to tire pressure, has been met.

Optionally, the method comprises, in response to determining that a transition from Weight on Wheels to Weight off Wheels has occurred at the wheel, issuing an alert indicative of a transition from Weight on Wheels to Weight off Wheels at the wheel to one or more systems of the aircraft and/or one or more systems remote from the aircraft. This may allow such systems of the aircraft to initiate tasks associated with an aircraft take-off event, such as initiating landing gear retraction. The one or more systems of the aircraft or remote from the aircraft may comprise a model of the aircraft and the alert may be used to update the model.

Optionally, the method comprises, in response to determining that a transition from Weight on Wheels to Weight off Wheels has occurred at the wheel, storing, in a memory, data indicative of pressure change in the tire during the transition from Weight on Wheels to Weight off Wheels at the wheel. The one or more systems of the aircraft or remote from the aircraft may comprise a machine learning model of the aircraft and the alert may be used to update the model. The machine learning model may be configured to differentiate between tire pressure change due to a transition between Weight on Wheels and Weight off Wheels and tire pressure change due to, for example, normal pressure loss, temperature changes, pressure change due to rolling over obstacles and tire burst.

Optionally, the method comprises, in response to determining that a transition from Weight off Wheels to Weight on Wheels has occurred at the wheel, causing a braking system of the aircraft to initiate aircraft braking. This may result in earlier braking of the aircraft after landing of the aircraft, compared to aircraft braking being initiated on the basis of another aircraft criterion such as wheel speed or landing gear strut compression. In turn, this may result in a reduction in a distance travelled along a runway by the aircraft during deceleration after landing of the aircraft. The method may comprise causing the braking system to initiate braking at the wheel, to deploy one or more airbrakes or spoilers of the aircraft and/or to initiate reverse thrust of the aircraft.

Optionally, the method comprises, in response to determining that a transition from Weight off Wheels to Weight on Wheels has occurred at the wheel, issuing an alert indicative of transition from Weight off Wheels to Weight on Wheels at the wheel to one or more systems of the aircraft and/or one or more systems remote from the aircraft. This may such systems of the aircraft to initiate tasks associated with an aircraft landing event, such as commanding aircraft braking. The one or more systems of the aircraft or remote from the aircraft may comprise a machine learning model of the aircraft and the alert may be used to update the model. The machine learning model may be configured to differentiate between tire pressure change due to a transition between Weight on Wheels and Weight off Wheels and tire pressure change due to, for example, normal pressure loss, temperature changes, pressure change due to rolling over obstacles and tire burst.

Optionally, the method comprises, in response to determining that a transition from Weight off Wheels to Weight on Wheels has occurred at the wheel, storing, in a memory, data indicative of pressure change in the tire during the transition from Weight off Wheels to Weight on Wheels at the wheel. The memory may be local to the aircraft or may be comprised in a system remote from the aircraft, for example an aircraft maintenance scheduling system.

Optionally, the method comprises additionally determining whether a transition between Weight on Wheels and Weight off Wheels has occurred at the wheel on the basis of a predetermined criterion, wherein the predetermined criterion is different to pressure in the tire and is indicative that a transition between Weight on Wheels and Weight off Wheels has occurred at the wheel. Optionally, the predetermined criterion comprises a distance between a predefined point on the aircraft and the ground. Optionally, the predetermined criterion comprises a change in strut length of a strut of a landing gear of the aircraft. Optionally, the predetermined criterion comprises a change in rotational speed of the wheel. Optionally, the predetermined criterion comprises a deflection of the tire.

Optionally, the method comprises detecting that the determining is not possible on the basis of one of the predetermined criterion and pressure in the tire, and performing the determining on the basis of the other of the predetermined criterion and pressure in the tire. This may provide a level of redundancy in the determination of whether a transition between Weight on Wheels and Weight off Wheels has occurred.

Optionally, the method comprises comparing the determination on the basis of pressure in the tire to the determination on the basis of the predetermined criterion. Optionally, the method comprises generating a signal indicative that a transition between Weight on Wheels and Weight off Wheels has occurred at the wheel only in the event that both the determination on the basis of pressure in the tire and the determination on the basis of the predetermined criterion determine that a transition between Weight on Wheels and Weight off Wheels has occurred at the wheel. This may provide a more accurate and/or reliable method.

Optionally, the method comprises: measuring pressure in the tire at a first frequency of detection; detecting, on the basis of a predetermined criterion, an impending aircraft take-off or aircraft landing event; and, in response detecting an impending aircraft take-off or aircraft landing event, measuring the pressure at a second frequency of detection, higher than the first frequency of detection. Pressure in a tire typically reduces gradually over a matter of days. Existing tire pressure sensors thus generally measure pressure in a tire less frequently than is necessary to ensure that a tire pressure change due to a transition between Weight on Wheels and Weight off Wheels at the wheel is detected. A transition between Weight on Wheels and Weight off Wheels may occur in less than a second, for example over a period of from 0.1 to 0.4 seconds. By increasing the frequency of detection of pressure in the tire when an aircraft take-off or landing event is impending, a tire pressure change due to a transition between Weight on Wheels and Weight off Wheels at the wheel can be detected with higher reliability and fidelity.

For an impending aircraft take-off event, the predetermined criterion may comprise one or more of: a rotational speed of the wheel, an acceleration of the aircraft, the aircraft exceeding a threshold aircraft speed, temperature in the tire increasing by a threshold amount indicative of aircraft taxiing and/or acceleration, pressure in the tire increasing by a threshold amount indicative of aircraft taxiing and/or acceleration.

For an impending aircraft landing event, the predetermined criterion may comprise one or more of: a landing gear of the aircraft being locked in an extended position, aircraft speed, aircraft altitude, a position of one or more flaps of the aircraft.

The first frequency of detection may be in the region of 1 measurement per second. The second frequency of detection may be in the region of from 3 to 1000 measurements per second.

Optionally, the method comprises detecting, on the basis of a further predetermined criterion, that an aircraft take-off or landing event has occurred, and, in response to detecting that an aircraft take-off or aircraft landing event has occurred, measuring pressure in the tire at the first frequency of detection. This may ease pressure monitoring management at an overall aircraft system level at times where measuring pressure in the tire at the first frequency of detection is sufficient. The further predetermined criterion may comprise one or more of: aircraft speed, aircraft climb rate, a status of a landing gear of the aircraft, a status of a braking system of the aircraft, aircraft altitude and rotational speed of the wheel.

Optionally, the method comprises, in response to determining that a transition from Weight off Wheels to Weight on Wheels has occurred at the wheel: determining a maximum impact force on the wheel as the transition from Weight off Wheels to Weight on Wheels occurred at the wheel; determining, on the basis of the change in pressure in the tire and the determined maximum impact force, a descent rate of the aircraft; and determining whether the determined descent rate of the aircraft exceeds a threshold descent rate. The method may thus be used to detect so-called 'hard landings', in which the descent rate of the aircraft exceeds the threshold descent rate and thus causes a higher force to be imparted to the aircraft upon landing, compared to when the descent rate is below the threshold descent rate.

Optionally, the maximum impact force is determined on the basis of a maximum strain in a strut of a landing gear comprising the wheel during the transition from Weight off Wheels to Weight on Wheels. Optionally, the maximum impact force is determined on the basis of a rate of change of pressure in the tire and/or a maximum pressure in the tire during the transition from Weight off Wheels to Weight on Wheels.

Optionally, the method comprises, in response to determining that the determined descent rate of the aircraft exceeds the threshold descent rate, storing the determined descent rate in a memory. Optionally, the method comprises, in response to determining that the determined descent rate of the aircraft exceeds the threshold descent rate, issuing an alert indicative that the determined descent rate of the aircraft exceeds the threshold descent rate. The alert may cause maintenance crew to assess aircraft component integrity prior to a subsequent aircraft flight cycle.

A second aspect of the present invention provides a computer-implemented method comprising: performing a method according to the first aspect for a plurality of wheels of a landing gear of the aircraft; and determining, in response to determining that a transition between Weight on Wheels and Weight off Wheels has occurred at each of the plurality of wheels, that the landing gear has transitioned between Weight on Wheels and Weight off Wheels. Such a method may allow a machine learning system to learn what a typical aircraft take-off or landing event looks like, in terms of changes in pressure in tires of the landing gear. Such a method may help to reduce a chance of the method producing false positives. A false positive may be generated due to a change in tire pressure that is not due to a transition between Weight on Wheels and Weight off Wheels, for example due to a wheel of the landing gear rolling over a bump or hole on a runway.

Optionally, the method comprises performing the method according to the first aspect only for wheels of the landing gear with a tire at a pressure that is at or above a threshold pressure. Accordingly, underinflated tires, at pressures below the threshold pressure may not be used to determine whether the landing gear has transitioned between Weight on Wheels and Weight off Wheels. This may increase accuracy of the method because underinflated tires may not behave in the same manner as a correctly inflated tire during a transition between Weight on Wheels and Weight off Wheels.

Optionally, the method comprises performing the method according to the first aspect for all of the wheels of the landing gear.

A third aspect of the present invention provides a computer-implemented method comprising: performing a method according to the second aspect for each landing gear of the aircraft; and determining, on the basis of determining which wheels of the aircraft have transitioned between Weight on Wheels and Weight off Wheels, a load distribution of the aircraft across the landing gears of the aircraft.

Optionally, the method comprises determining a sequence in which the landing gear of the aircraft of transition between Weight on Wheels and Weight off Wheels. Optionally, the method comprises determining whether an aircraft take-off event or an aircraft landing event has occurred, on the basis of the sequence determined. Optionally, the method comprises determining that an aircraft take-off event has occurred on the basis of a transition from Weight on Wheels to Weight off Wheels occurring at a nose landing gear of the aircraft before at a main landing gear, aft of the nose landing gear, of the aircraft. Optionally, the method comprises determining that an aircraft landing event has occurred on the basis of a transition from Weight off Wheels to Weight on Wheels occurring at the main landing gear before at the nose landing gear.

A fourth aspect of the present invention provides a computer-implemented method comprising: performing a method according to the first aspect for each wheel of the aircraft; and determining, on the basis of determining which wheels of the aircraft have transitioned between Weight on Wheels and Weight off Wheels, a load distribution of the aircraft across the wheels of the aircraft.

Optionally, the method comprises determining a sequence in which the wheels of the aircraft of transition between Weight on Wheels and Weight off Wheels. Optionally, the method comprises determining whether an aircraft take-off event or an aircraft landing event has occurred, on the basis of the sequence determined.

Methods according to the third and fourth aspects may help to permit tuning of aircraft handling during or immediately after an aircraft take-off or landing event. Methods according to the third and fourth aspects may permit determination of a Weight on Wheels or Weight off Wheels status at aircraft-level.

It will be appreciated that features described with reference to one of the first to fourth aspects may equally be applicable to any other of the first to fourth aspects.

A fifth aspect of the present invention provides a controller for an aircraft. The controller is configured to: receive a signal indicative of pressure in a tire of a wheel of the aircraft; and determine, on the basis of the signal, whether a transition between Weight on Wheels and Weight off Wheels has occurred at the wheel. As discussed above, a change in tire pressure may accurately indicate a transition between Weight on Wheels and Weight off Wheels in real-time. In turn, aircraft systems that depend on an indication of Weight on Wheels or Weight off Wheels to function may be employed sooner after the transition between Weight on Wheels and Weight off Wheels has occurred compared to other controllers for determining whether a transition between Weight on Wheels and Weight off Wheels has occurred. An existing controller of the aircraft may thus be supplied with additional software to determine whether a transition between Weight on Wheels and Weight off Wheels has occurred at the wheel on the basis of the signal, and thus be used for the dual purpose of the controller's existing function and the function of determining whether a transition between Weight on Wheels and Weight off Wheels has occurred at the wheel.

Optionally, the controller is configured is determine that a transition between Weight on Wheels and Weight off Wheels has occurred at the wheel on the basis of the signal being indicative that pressure in the tire has changed by at least a threshold pressure change. The threshold pressure change may be at least 1%, at least 2%, at least 3% or a at least 4% of pressure in the tire. The threshold pressure change may occur in a time of no more than 0.5 seconds, or no more than 0.4 seconds. Optionally, the controller is configured to determine whether the threshold pressure change occurred during an aircraft take-off or landing event, for example on the basis of one or more of: an altitude of the aircraft, a rotational speed of the wheel, a position of a landing gear of the aircraft, and a speed of the aircraft.

Optionally, the controller is configured to determine that a transition from Weight on Wheels to Weight off Wheels has occurred at the wheel on the basis of the signal being indicative of a decrease in pressure in the tire. Optionally, the controller is configured to determine that a transition from Weight off Wheels to Weight on Wheels has occurred at the wheel on the basis of the signal being indicative of an increase in pressure in the tire.

Optionally, the controller is configured to perform a method according to any one of the first to fourth aspects.

A sixth aspect of the present invention provides a system for an aircraft, the system comprising: a tire pressure monitoring system configured to detect pressure in a tire of a wheel of the aircraft and output a signal indicative of the pressure detected; and a controller configured to receive the signal and determine, on the basis of the signal, whether a transition between Weight on Wheels and Weight off Wheels has occurred at the wheel. As discussed above, a change in tire pressure may accurately indicate a transition between Weight on Wheels and Weight off Wheels in real-time. In turn, aircraft systems that depend on an indication of Weight on Wheels or Weight off Wheels to function may be employed sooner after the transition between Weight on Wheels and Weight off Wheels has occurred compared to other systems for determining whether a transition between Weight on Wheels and Weight off Wheels has occurred.

A number of existing aircraft comprise a tire pressure monitoring system, which is used for other functions, such as tire underinflation detection. The system may therefore be relatively easy to retrofit to such existing aircraft, without the need for additional hardware. The controller may be an existing controller of the aircraft, which may be provided with additional software to determine whether a transition between Weight on Wheels and Weight off Wheels has occurred at the wheel, on the basis of a signal generated by an existing tire pressure monitoring system.

Optionally, the tire pressure monitoring system comprises an analogue sensor configured to sense pressure in the tire, and the signal is indicative of pressure sensed by the analogue sensor. An analogue sensor may be able to issue the signal within 0.005 s, or within 0.003 s, of pressure in the tire being detected. This may allow close to real-time determination by the controller as to whether a transition between Weight on Wheels and Weight off Wheels has occurred at the wheel. An analogue sensor may provide a more rapid indication of pressure than a digital sensor, for example because no delay due to a digital conversion is incurred. An analogue sensor may thus provide a more reliable real-time indication of pressure in the tire.

Optionally, the system comprises a wired communication connection between the tire pressure monitoring system and the controller. This may provide more reliable communication between the tire pressure monitoring system and the controller compared to a wireless communication connection. Optionally, the analogue sensor is a wired, rather than wireless, sensor.

Optionally, the controller is configured to cause the tire pressure monitoring system to detect the pressure in the tire at a first detection rate, and to increase the detection rate to a second detection rate in response to a determination by the controller, on the basis of a predetermined criterion, of an impending aircraft take-off or aircraft landing event. Pressure in a tire typically reduces gradually over a matter of days. Existing tire pressure sensors thus generally measure pressure in a tire less frequently than is necessary to ensure that a tire pressure change due to a transition between Weight on Wheels and Weight off Wheels at the wheel is detected. A transition between Weight on Wheels and Weight off Wheels may occur in less than a second, for example over a period of from 0.1 to 0.4 seconds. By increasing the frequency of detection of pressure in the tire when an aircraft take-off or landing event is impending, a tire pressure change due to a transition between Weight on Wheels and Weight off Wheels at the wheel can be detected with higher reliability and fidelity.

For an impending aircraft take-off event, the predetermined criterion may comprise one or more of: a rotational speed of the wheel, an acceleration of the aircraft, the aircraft exceeding a threshold aircraft speed, temperature in the tire increasing by a threshold amount indicative of aircraft taxiing and/or acceleration, pressure in the tire increasing by a threshold amount indicative of aircraft taxiing and/or acceleration.

For an impending aircraft landing event, the predetermined criterion may comprise one or more of: a landing gear of the aircraft being locked in an extended position, aircraft speed, aircraft altitude, a position of one or more flaps of the aircraft.

The first detection rate may be in the region of 1 measurement per second. The second detection rate may be more than 1 measurement per second, for example in the region of from 2 to 1000 measurements per second. A detection rate of around 2.5 to 5 measurements per second may be sufficient to detect a transition between Weight on Wheels and Weight off Wheels. A detection rate of around 500 to 1000 measurements per second may be sufficient to enable detection of a hard landing event.

Optionally, the controller is configured to cause the tire pressure monitoring system to detect the pressure in the tire at the first detection rate in response to a determination by the controller, on the basis of a further predetermined criterion, that an aircraft take-off or aircraft landing event has occurred. This may ease pressure monitoring management at an overall aircraft system level at times where measuring pressure in the tire at the first frequency of detection is sufficient. The further predetermined criterion may comprise one or more of: aircraft speed, aircraft climb rate, a status of a landing gear of the aircraft, a status of a braking system of the aircraft, aircraft altitude and rotational speed of the wheel.

Optionally, the controller is configured to differentiate between a change in tire pressure due to a transition between Weight on Wheels and Weight off Wheels, and a change in tire pressure due to a different influencing factor. The different influencing factor may be, for example, a change in temperature, tire burst and tire inflation during maintenance. Optionally, the controller is in communication with a machine learning model configured to differentiate between tire pressure change due to a transition between Weight on Wheels and Weight off Wheels and tire pressure change due to, for example, normal pressure loss, temperature changes, pressure change due to rolling over obstacles and tire burst.

Optionally, the system is configured to output a signal to another aircraft system, the signal indicative that a transition between Weight on Wheels and Weight off Wheels has occurred at the wheel. The another aircraft system may be configured to initiate a process on the basis of the signal being indicative that a transition between Weight on Wheels and Weight off Wheels has occurred at the wheel. The another aircraft system may comprise one or more of: a landing gear extension and retraction system, a wheel steering system and an aircraft braking system.

Optionally, the tire pressure monitoring system is configured to detect pressure in a tire of each wheel of the aircraft and to output respective signals indicative of pressure detected in each tire, and the controller is configured to determine whether a transition between Weight on Wheels and Weight off Wheels has occurred at each wheel, on the basis of the respective signal indicative of the pressure detected in the respective tire.

Optionally, the controller is configured to determine whether the aircraft has transitioned between being on the ground and being airborne on the basis of the signals indicative of the pressure detected in the tires of each of the wheels of the aircraft.

Optionally, the tire pressure monitoring system is configured to detect pressure in a plurality of tires of a landing gear of the aircraft comprising the wheel and to output respective signals indicative of pressure detected in each tire of the plurality of tires, and the controller is the controller is configured to determine whether a transition between Weight on Wheels and Weight off Wheels has occurred at the landing gear, on the basis of the respective signal indicative of the pressure detected in the respective tire.

Optionally, the controller is a controller according to the fifth aspect.

Optionally, the system is configured to perform a method according to any one of the first to fourth aspects.

A seventh aspect of the present invention provides a non-transitory storage medium configured to store machine readable instructions which, when executed by a processor, cause the processor to initiate a method according to any one of the first to fourth aspects.

An eighth aspect of the present invention provides an aircraft comprising: a controller according to the fifth aspect, a system according to the sixth aspect, or a non-transitory storage medium according to the seventh aspect.

BRIEF DESCRIPTION OF THE DRAWINGS

Embodiments of the invention will now be described, by way of example only, with reference to the accompanying drawings, in which.

DETAILED DESCRIPTION OF THE PREFERRED EMBODIMENTS

Figure 1:
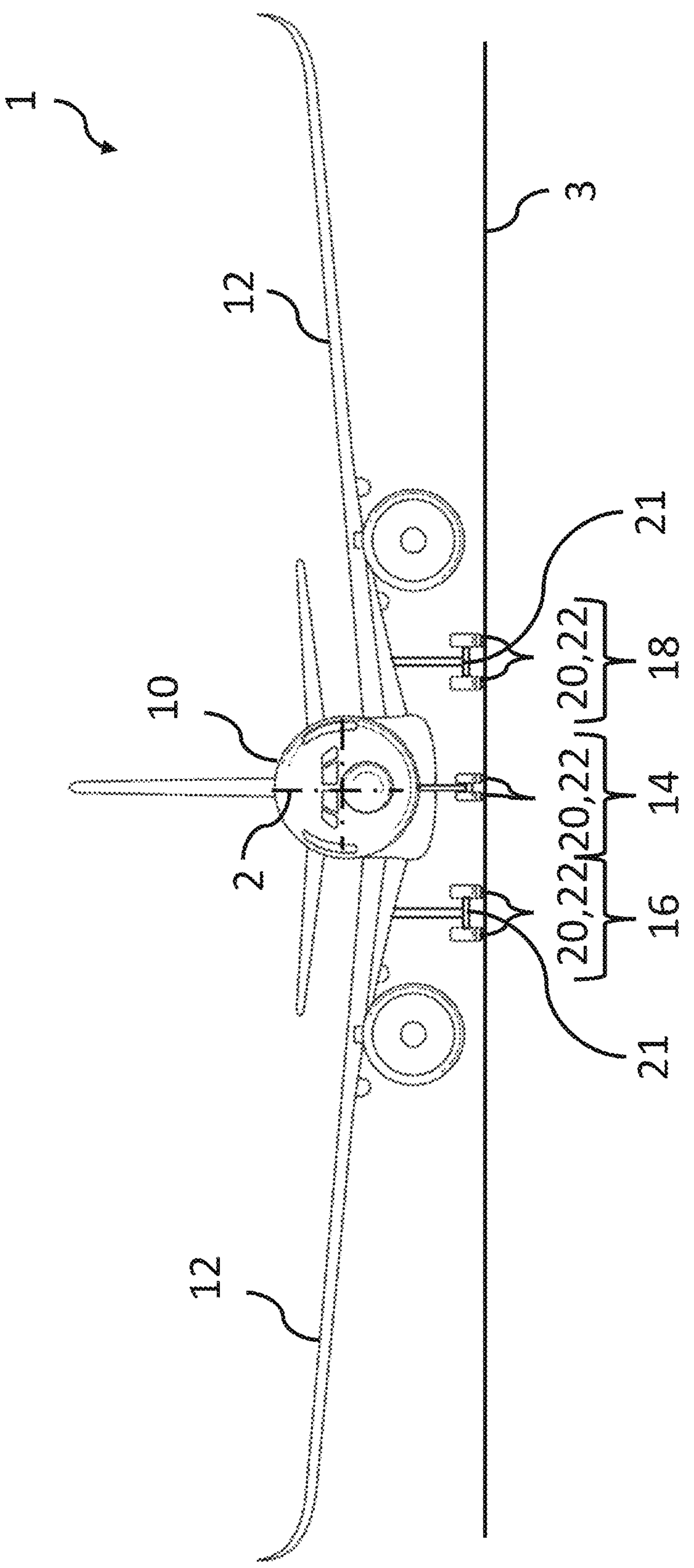
FIG. 1 shows a schematic view of an aircraft according to an example.
Figure 2:
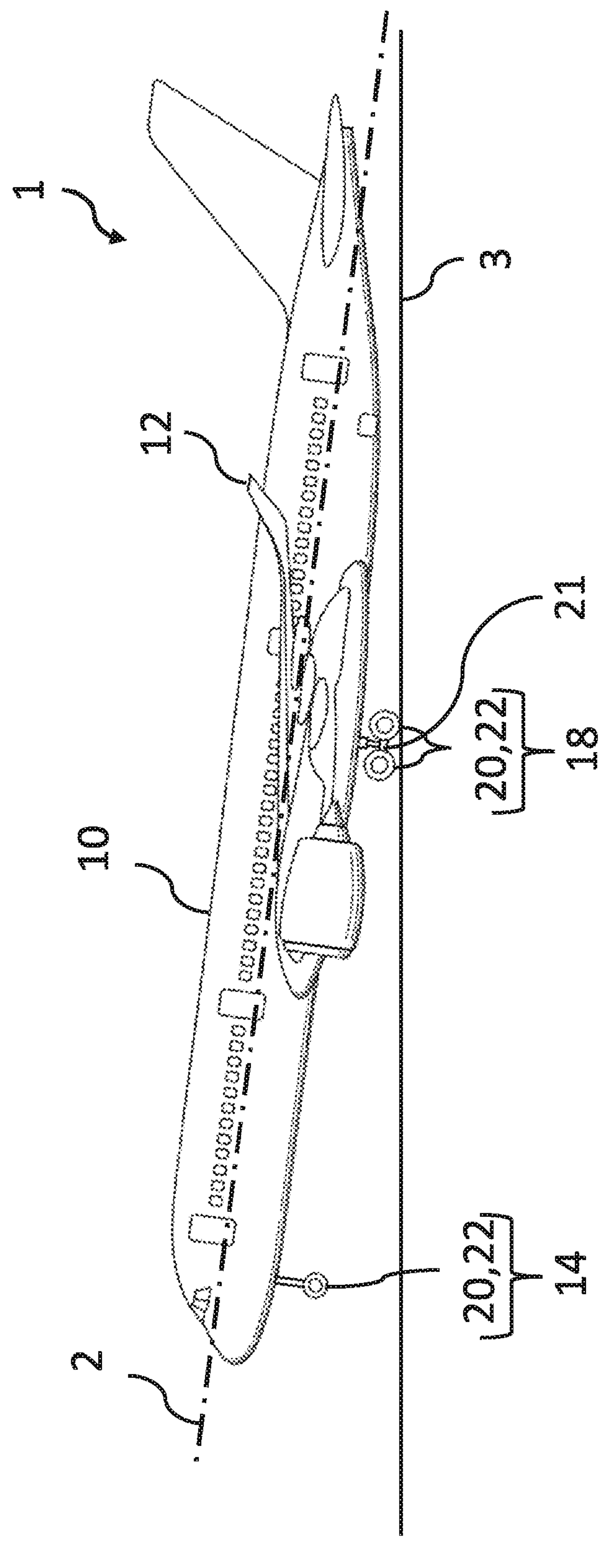
FIG. 2 shows a schematic view of the aircraft of FIG. 1 during an aircraft landing or take-off event.
Figure 3:
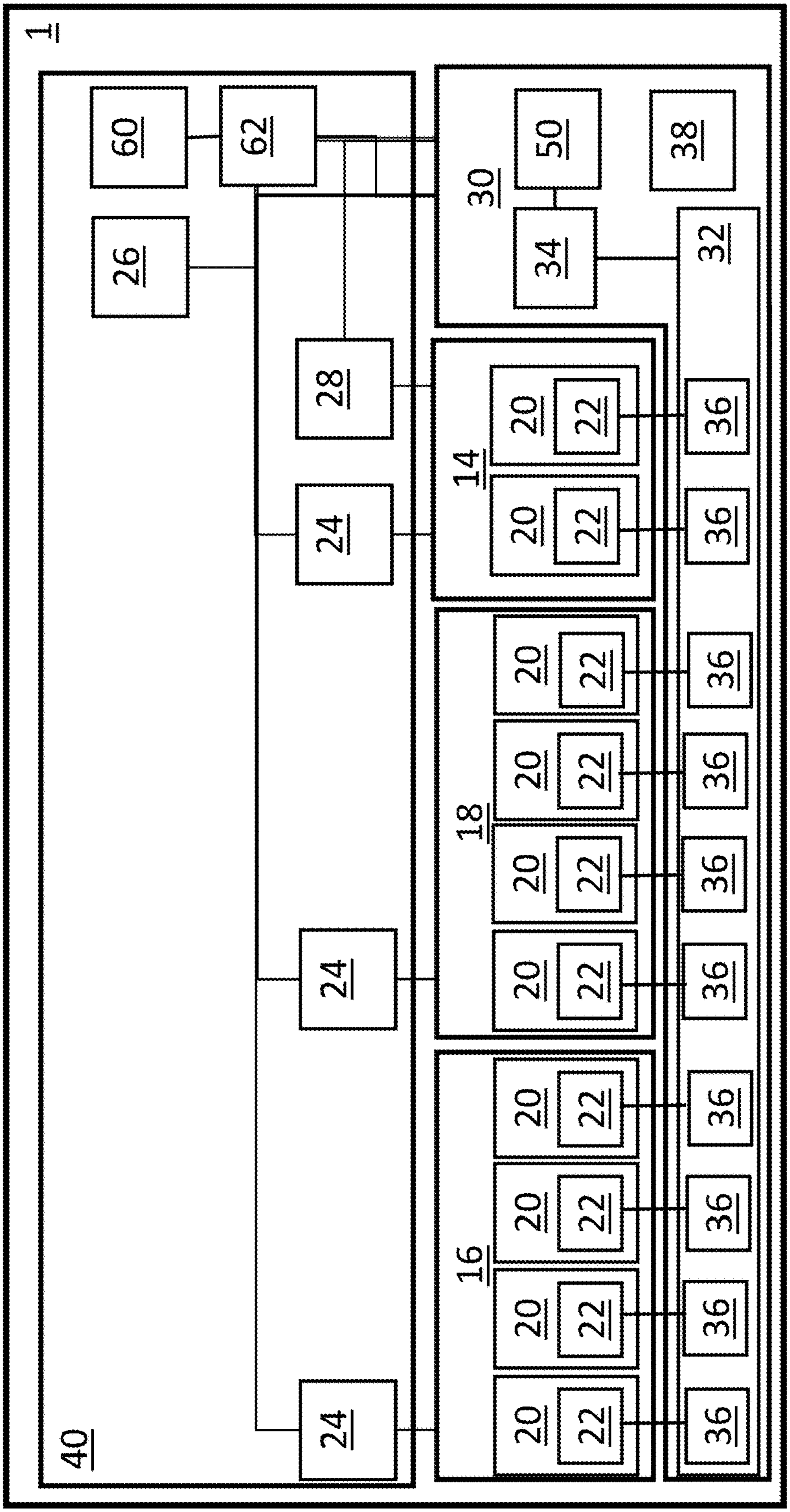
FIG. 3 shows a schematic system view of the aircraft of FIG. 1.

FIGS. 1 and 2 show an aircraft 1 according to an example. In FIG. 1, the aircraft 1 is on the ground 3. In FIG. 2, the aircraft is transitioning between being on the ground 3 and being airborne. FIG. 3 is a schematic example of parts of the aircraft 1 relevant to the disclosure.

The aircraft 1 comprises a fuselage 10, wings 12 extending from opposing sides of the fuselage, a nose landing gear 14, a first main landing gear 16 and a second main landing gear 18 (collectively referred to herein as the landing gears 14, 16, 18). The first and second main landing gears 16, 18 are positioned aft of the nose landing gear 14 and to opposing sides of a central longitudinal axis 2 of the aircraft 1. Each landing gear 14, 16, 18 comprises a plurality of wheels 20 each having a tire 22. In this example, the nose landing gear 14 comprises two wheels, and each of the main landing gears 16, 18 comprises four wheels. The aircraft also comprises a respective landing gear extension and retraction system 24 for each of the landing gears 14, 16, 18, an aircraft braking system 26 for braking the aircraft when the aircraft is on the ground 3, and a nose wheel steering system 28 for steering the aircraft when the aircraft is on the ground 3.

When the aircraft 1 is on the ground 3, the landing gears 14, 16, 18 are each in respective extended positions and together support the weight of the aircraft 1. The nose wheel steering system 28 turns the nose landing gear 14 to steer the aircraft 1 during taxiing of the aircraft 1. When the aircraft is in a cruise phase of flight, the landing gears 14, 16, 18 are each in respective stowed positions within the fuselage 10. Stowing the landing gears reduces drag on the aircraft 1 in-flight. Before landing, the landing gears 14, 16, 18 are extended by the landing gear extension and retraction systems 24 from the stowed position to the extended position.

During an aircraft take-off event, the function of a number of aircraft systems is dependent on the aircraft having left the ground 3. Accurate detection of aircraft lift-off is therefore important. For example, the landing gears 14, 16, 18 are retracted by the landing gear extension and retraction systems 24 from the extended position to respective stowed positions after the aircraft 1 becomes airborne. It is desirable to retract the landing gears 14, 16, 18 as soon as possible after aircraft lift-off to reduce drag on the aircraft 1 and to reduce a noise footprint of the aircraft 1 during an initial climb phase of flight, but without permitting landing gear retraction whilst the landing gear is still supporting the weight of the aircraft 1. Typically, retraction of the landing gears 14, 16, 18 is initiated in response to a command from flight crew of the aircraft 1, which may be issued once a positive climb rate of the aircraft 1 has been established, which may be around 3 seconds after aircraft lift-off.

During an aircraft landing event, the function of a number of aircraft systems is dependent on the aircraft having contacted the ground 3. For example, when it has been established that the aircraft 1 has landed, the aircraft braking system 26 and the nose wheel steering system 28 are enabled to permit control of the aircraft 1 during deceleration from a landing speed of the aircraft 1, for example to a suitable taxiing speed. It is desirable to slow the aircraft 1 as soon as possible after an aircraft contacts the ground 3, to reduce a stopping distance of the aircraft and/or reduce the braking force required to be generated by the aircraft braking system 26 whilst stopping the aircraft 1 within an acceptable distance. However, premature braking by the aircraft braking system, before the aircraft is in contact with the ground 3, may inhibit landing performance. It is also desirable to enable steering control of the aircraft 1 as soon as possible after the aircraft 1 contacts the ground 3, for example to counteract forces on the aircraft 1 that cause the aircraft 1 to veer off course such as crosswinds, uneven aircraft loading or runway camber. However, premature steering of the aircraft by nose wheel steering system 28, before wheels of the nose landing gear 14 are in contact with the ground 3 may inhibit landing performance.

For a period of time during both aircraft take-off and aircraft landing, the main landing gears 16, 18 would be expected to be in contact with the ground 3 whilst the nose landing gear 14 is not in contact with the ground 3, as best shown in FIG. 2.

Disclosed herein are example aircraft controllers, aircraft systems, computer-implemented methods and an aircraft 1 that enable detection, such as in real-time during a landing or take-off event, of an aircraft transitioning between being on the ground 3 and in-flight, and which may therefore enable aircraft systems that are dependent on the aircraft having left the ground 3 to be employed sooner after lift-off than in previous aircraft and/or aircraft systems that are dependent on the aircraft having made contact with the ground 3 to be employed sooner after landing than in previous aircraft.

Figure 4:
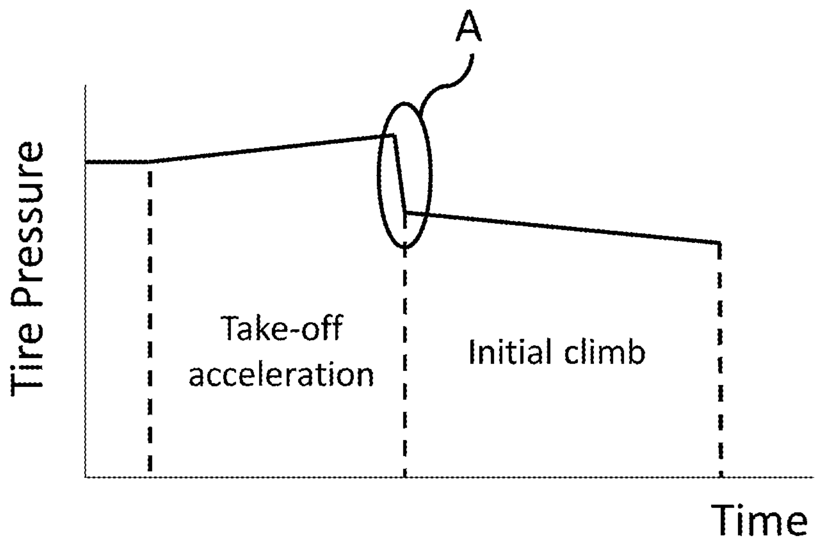
FIG. 4 depicts tire pressure against time during an aircraft take-off event.
Figure 5:
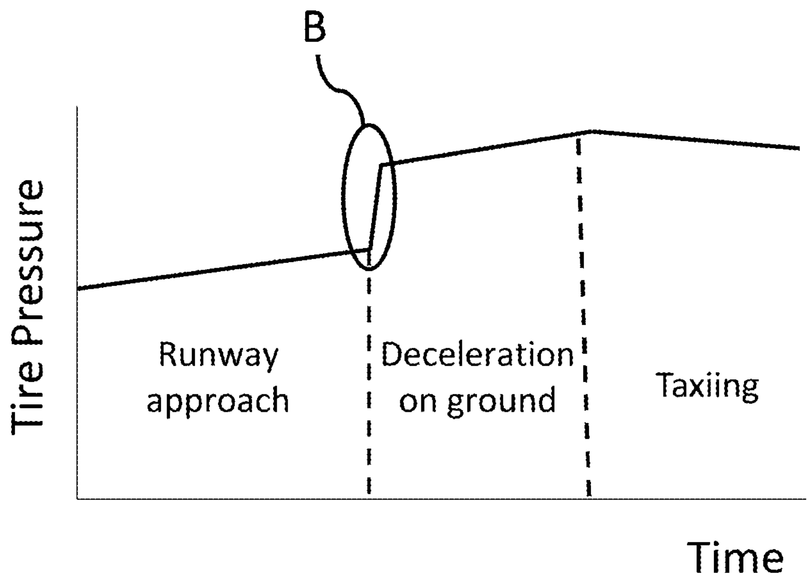
FIG. 5 depicts tire pressure against time during an aircraft landing event.

It has been found that, a transition between Weight on Wheels and Weight off Wheels at an aircraft wheel can be determined based on change in tire pressure at the aircraft wheel. In turn, a landing gear- or aircraft-level transition between Weight on Wheels and Weight off Wheels can be determined. FIG. 4 shows schematically how tire pressure changes rapidly, at region A of FIG. 4, due to a transition from Weight on Wheels to Weight off Wheels during an aircraft take-off event. FIG. 5 shows schematically how tire pressure changes rapidly, at region B of FIG. 5, due to a transition from Weight off Wheels to Weight on Wheels during an aircraft landing event. Whilst, in practice, tire pressure readings may be relatively 'noisy' during aircraft take-off and landing events, a transition between Weight on Wheels and Weight off Wheels is discernible since the change in pressure is relatively large, rapid and is then generally sustained.

The aircraft 1 comprises a Weight on/off Wheels detection system 30, herein after referred to as the WoW system 30, as shown in FIG. 3. The WOW system 30 comprises a tire pressure monitoring system 32 and a controller 34. In this example, the WOW system 30 is a central aircraft-level system, but in other examples the aircraft 1 comprises a WoW system 30 for each landing gear 14, 16, 18 of the aircraft 1 and a central controller in communication with each controller 34 of the WoW systems 30.

The tire pressure monitoring system 32 has ten pressure sensors 36, which in this example are analogue pressure sensors but may be digital pressure sensors in other examples. Each tire 22 of the aircraft 1 is fitted with a respective one of the pressure sensors 36. Each pressure sensor 36 senses pressure in the respective tire 22 and to generate a respective signal that is indicative of pressure sensed in the respective tire 22 and that is receivable the controller 34. In this example, each pressure sensor 36 is in wired communication with the controller 34, but in other examples wireless communication may be employed.

The controller 34 receives signals from other systems of the aircraft 1, generally designated 40 in the Figures. Other systems of the aircraft 1 is intended to cover any system of the aircraft that is not the WoW system 30. The signals received from the other systems 40 are indicative of whether an aircraft landing or take-off event is impending. On the basis of the signals received from the other systems 40, the controller 34 determines whether an aircraft landing or take-off event is impending. In this example, a signal indicative that an aircraft landing event is impending is received from at least one of the landing gear extension and retraction systems 24 and is indicative that the respective landing gear 14, 16, 18 has been extended from the stowed position to the extended position. In this example, a signal indicative that an aircraft take-off event is impending received from an aircraft speed detection system (not shown) and is indicative that aircraft acceleration has exceeded a predefined acceleration threshold.

In the event that the controller 34 determines that an aircraft landing or take-off event is not impending, the controller 34 causes the tire pressure monitoring system 32 to cause the pressure sensors 36 to monitor pressure in the respective tires 22 are a detection rate of around once per second. In the event that the controller 34 determines that an aircraft landing or take-off event is impending, the controller 34 causes the tire pressure monitoring system 32 to cause the pressure sensors 36 to monitor pressure in the respective tires 22 at a detection rate of around five hundred times per second. In other examples, in the event that the controller 34 determines that an aircraft landing or take-off event is impending, the controller 34 causes the tire pressure monitoring system 32 to cause the pressure sensors 36 to monitor pressure in the respective tires 22 are at a detection rate of around three times per second.

The controller 34 receives further signals from other aircraft systems 40, which are indicative of whether the impending aircraft landing or take-off event has occurred, and to determine, on the basis of the further signals received, whether the impending aircraft landing or take-off event has occurred. In this example, a further signal indicative that an aircraft landing event has occurred is received from at least one of the landing gear extension and retraction systems 24 and is indicative that a strut (not shown) of the respective landing gears 14, 16, 18 has decreased in length by a predefined amount. In this example, a further signal indicative that an aircraft take-off event has occurred is received from an aircraft climb rate detection system (not shown) and is indicative that a predefined aircraft climb rate has been achieved for a predefined period of time.

In the event that the controller 34 determines that the impending aircraft landing or take-off event has not occurred, the controller 34 causes the tire pressure monitoring system 32 to cause the pressure sensors 36 to continue to monitor pressure in the respective tires 22 are a detection rate of around five hundred times per second. In the event that the controller 34 determines that the impending aircraft landing or take-off event has occurred, the controller 34 causes the tire pressure monitoring system 32 to cause the pressure sensors 36 to return to monitoring pressure in the respective tires 22 are a detection rate of around once per second.

In the event that the controller 34 determines that an aircraft landing or take-off event is impending, the controller 34 determines, for each wheel 20 of the aircraft 1, whether a transition between Weight on Wheels and Weight off Wheels has occurred on the basis of the respective signal from the respective pressure sensor 36 indicative of pressure in the tire 22 of that wheel 20. The WOW system 30 transmits a wheel transition signal indicative of whether the controller 34 has determined that a transition between Weight on Wheels and Weight off Wheels at the wheel 20 to one or more other aircraft systems 40.

The controller 34 determines that a transition between Weight on Wheels and Weight off Wheels has occurred at the respective wheel 20 on the basis of the respective signal being indicative that pressure in the respective tire 22 has changed by at least 3% in a time of no more than 0.4 seconds during a time in which the controller 34 has determined that an aircraft landing or take-off event is impending. It will be appreciated that in other examples the percentage change in tire pressure may be other than 3% and the time over which the change occurs may be other than 0.4 seconds. The controller 34 determines that a transition from Weight on Wheels to Weight off Wheels has occurred on the basis of the change being a decrease in pressure, and to determine that a transition from Weight off Wheels to Weight on Wheels has occurred on the basis of the change being an increase in pressure. The wheel transition signal transmitted by the WoW system 30 is indicative of whether a transition from Weight off Wheels to Weight on Wheels or a transition from Weight on Wheels to Weight off Wheels has occurred.

On the basis of determining whether a transition between Weight on Wheels and Weight off Wheels has occurred at each wheel 20 of the aircraft 1, the controller 34 determines a load distribution of the weight of the aircraft 1 across the wheels 20 of the aircraft 1. The position of each wheel 20 on a landing gear 14, 16, 18 of the aircraft 1 is known by the controller 34. The position of each wheel 20 is stored in a memory 38 of the WOW system 30, and the signal generated by each pressure sensor 36 comprises an identifier that identifies which wheel 20 the signal is associated with. The controller 34 thus determines which signals are associated with each landing gear 14, 16, 18, and determines which landing gears 14, 16, 18 are supporting the weight of the aircraft 1 based on whether the wheels of that landing gear 14, 16, 18 have transitioned between Weight on Wheels and Weight off Wheels. The WoW system 30 transmits a load distribution signal indicative of the load distribution determined by the controller 34 to one or more other aircraft systems 40.

The controller 34 determines, on the basis of respective signals indicative of pressure in the tire 22 of the wheels 20 of one of the landing gears 14, 16, 18, whether a transition between Weight on Wheels and Weight off Wheels has occurred at that landing gear 14, 16, 18. In the event that the controller 34 determines that a transition from Weight on Wheels to Weight off Wheels has occurred at the landing gear 14, 16, 18, the WoW system 30 transmits, to at least the landing gear extension and retraction system 24 of that landing gear 14, 16, 18, a landing gear Weight off Wheels signal indicative that the landing gear 14, 16, 18 has transitioned from Weight on Wheels to Weight off Wheels. In the event that the controller 34 determines that a transition from Weight off Wheels to Weight on Wheels has occurred at the landing gear 14, 16, 18, the WoW system 30 transmits, to at least the aircraft braking system 26, a landing gear Weight on Wheels signal that is indicative that the landing gear 14, 16, 18 has transitioned from Weight off Wheels to Weight on Wheels.

The controller 34 also determines, on the basis of each of the signals indicative of pressure in the tires 22 of the aircraft 1, whether the aircraft 1 as a whole has transitioned between being airborne and being on the ground 3. In the event that the controller 34 determines that the aircraft 1 has transitioned from Weight on Wheels to Weight off Wheels, the WOW system 30 transmits, to at least the landing gear extension and retraction systems 24, a lift-off signal indicative that the aircraft 1 has transitioned from Weight on Wheels to Weight off Wheels. In the event that the controller 34 determines that the aircraft 1 has transitioned from Weight off Wheels to Weight on Wheels, the WoW system 30 transmits, to at least the nose wheel steering system 28, a ground contact signal indicative that the aircraft 1 has transitioned from Weight off Wheels to Weight on Wheels.

The WoW system 30 comprises a memory 38 stores data indicative of pressure sensed in each wheel 20 by each of the pressure sensors 36 during an aircraft landing or take-off event, and to store data indicative of determinations made by the controller 34 in respect of transitions between Weight on Wheels and Weight off Wheels at wheel-, landing gear- and aircraft-level.

The WoW system 30 transmits one or more signals to a plurality of other systems of the aircraft 1, each signal indicative of a determination of the controller 34. In this example, the plurality of other systems comprises the landing gear extension and retraction systems 24 for each landing gear 14, 16, 18 and the braking system 26.

The WoW system 30 further comprises an alternative WoW detection system 50. The alternative WoW detection system 50 comprises three proximity sensors (not shown), each associated with a respective one of the landing gears 14, 16, 18. Each proximity sensor generates a respective proximity signal indicative of a distance between an axle 21 of the respective landing gear 14, 16, 18 and the ground 3. The controller 34 determines, for each landing gear 14, 16, 18 on the basis of the respective proximity signal, whether a transition between Weight on Wheels and Weight off Wheels has occurred at the landing gear 14, 16, 18.

In this example, the controller 34 detects an altered operational mode in the tire pressure monitoring system 32 or the alternative WOW detection system 50. An altered operational mode is a mode in which the system 32, 50 is operating outside normal operating parameters such that an output from the system 32, 50 may be unreliable. In the event that an altered operational mode is detected in one of the tire pressure monitoring system 32 and the alternative WoW detection system 50, to determine whether a transition between Weight on Wheels and Weight off Wheels has occurred at a landing gear on the basis of relevant signals received from the other of the tire pressure monitoring system 32 and the alternative WoW detection system 50. In the event that the tire pressure monitoring system 32 or the alternative WOW detection system 50 are both determined to be operational, the controller 34 determines that a transition between Weight on Wheels and Weight off Wheels has occurred at a landing gear 14, 16, 18 only when both systems 32, 50 are indicative that a transition between Weight on Wheels and Weight off Wheels has occurred at the landing gear 14, 16, 18.

It will be appreciated that in other examples, the alternative WOW detection system 50 may be separate from the WoW system 30 or may be omitted.

Figure 6:
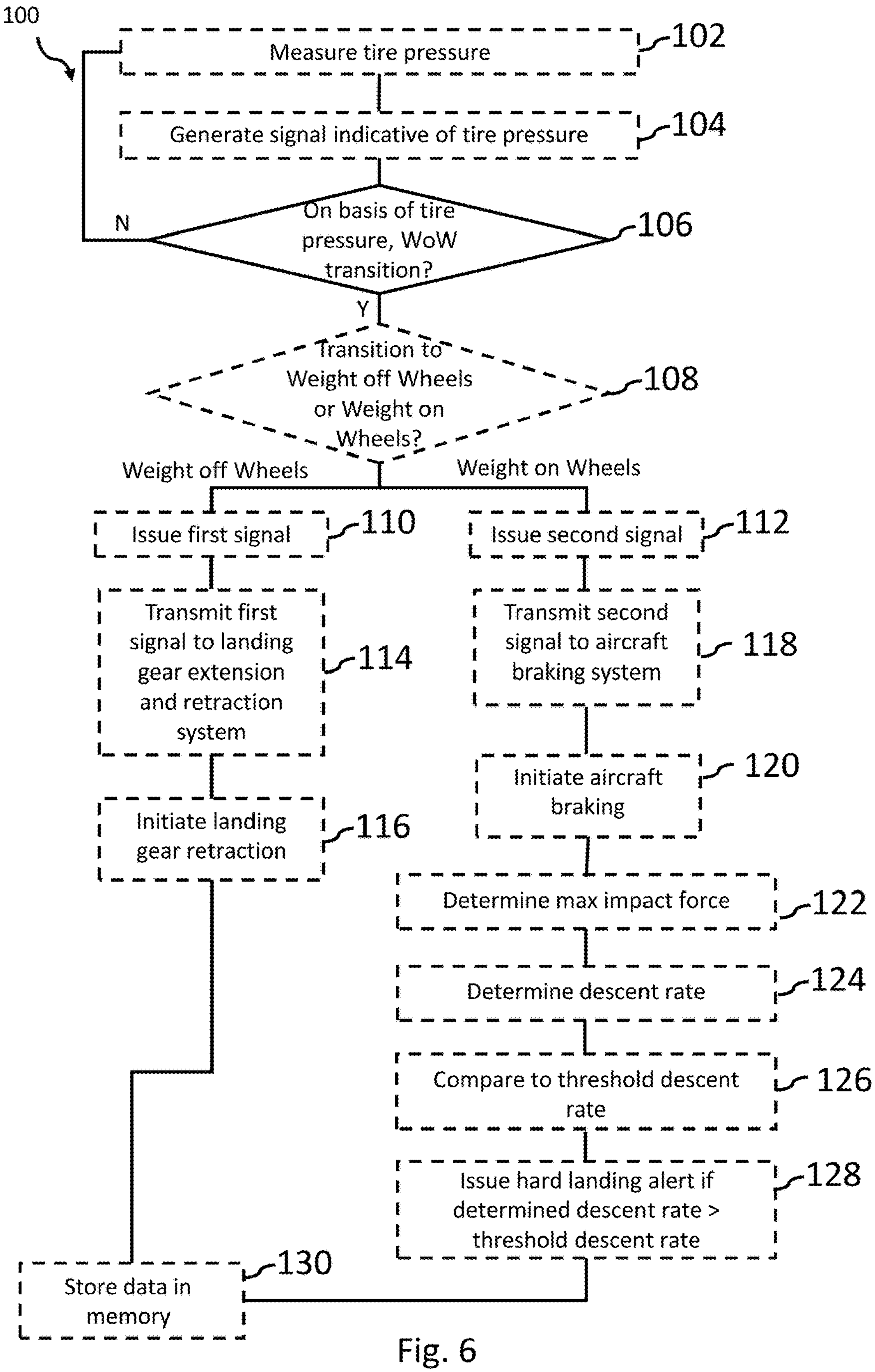
FIG. 6 shows a first method according to an example.

FIG. 6 shows a first method 100 according to an example. The first method 100 is a computer-implemented method. The first method 100 comprises measuring, in this example with a tire pressure sensor, pressure in a tire of a wheel of an aircraft (block 102), generating a signal indicative of the tire pressure measured (block 104), and determining, on the basis of a change in pressure indicated by the signal, whether a transition between Weight on Wheel and Weight off Wheels has occurred at the wheel (block 106). The transition may be from Weight on Wheels to Weight off Wheels or Weight off Wheels to Weight on Wheels, and the method comprises identifying which of such transitions has occurred.

In this example, the determining whether a transition between Weight on Wheels and Weight off Wheels has occurred at the wheel (block 106) comprises determining that a transition from Weight on Wheels to Weight off Wheels has occurred on the basis of the signal being indicative of a decrease in tire pressure of at least 3% in a time of no more than 0.4 seconds. It will be appreciated that in other examples the percentage change in tire pressure may be other than 3% and the time over which the change occurs may be other than 0.4 seconds. The determining whether a transition between Weight on Wheels and Weight off Wheels has occurred at the wheel (block 106) also comprises determining that a transition from Weight off Wheels to Weight on Wheels has occurred on the basis of the signal being indicative of an increase in tire pressure of at least 3% in a time of no more than 0.4 seconds.

The first method 100 further comprises determining whether the transition between Weight on Wheels and Weight off Wheels is a transition from Weight on Wheels to Weight off Wheels or a transition from Weight off Wheels to Weight on Wheels (block 108). The first method 100 then comprises issuing a first signal, on the basis of determining that a transition from Weight on Wheels to Weight off Wheels has occurred at the wheel (block 110), and issuing a second signal different to the first signal, on the basis of determining that a transition from Weight off Wheels to Weight on Wheels has occurred at the wheel (block 112).

In this example, the first signal is transmitted to a landing gear extension and retraction system of the aircraft (block 114) and the first method 100 comprises causing the landing gear extension and retraction system to initiate retraction of a landing gear of the aircraft on the basis of the first signal (block 116). In this example, the second signal is transmitted to an aircraft braking system of the aircraft (block 118) and the first method 100 comprises causing the aircraft braking system to initiate braking of the aircraft on the basis of the second signal (block 120).

The first method 100 further comprises, in response to determining that a transition from Weight off Wheels to Weight on Wheels has occurred at the wheel (block 106), determining a maximum impact force on the wheel as the transition from Weight off Wheels to Weight on Wheels occurred at the wheel (block 122). In this example, the maximum impact force on the wheel is determined on the basis of a maximum strain in a strut of a landing gear comprising the wheel during the transition from Weight off Wheels to Weight on Wheels.

The first method 100 further comprises determining, on the basis of the change in pressure in the tire and the determined maximum impact force, a descent rate of the aircraft at the time of landing (block 124), comparing the determined descent rate to a threshold descent rate (block 126), and issuing a hard landing alert (block 128) in the event that the determined descent rate exceeds the threshold descent rate.

The first method 100 further comprises storing data in a memory (block 130), the data comprising data indicative of pressure change in the tire during the transition between Weight on Wheels and Weight off Wheels at the wheel, data indicative of the determined decent rate and data indicative of the maximum impact force.

Figure 7:
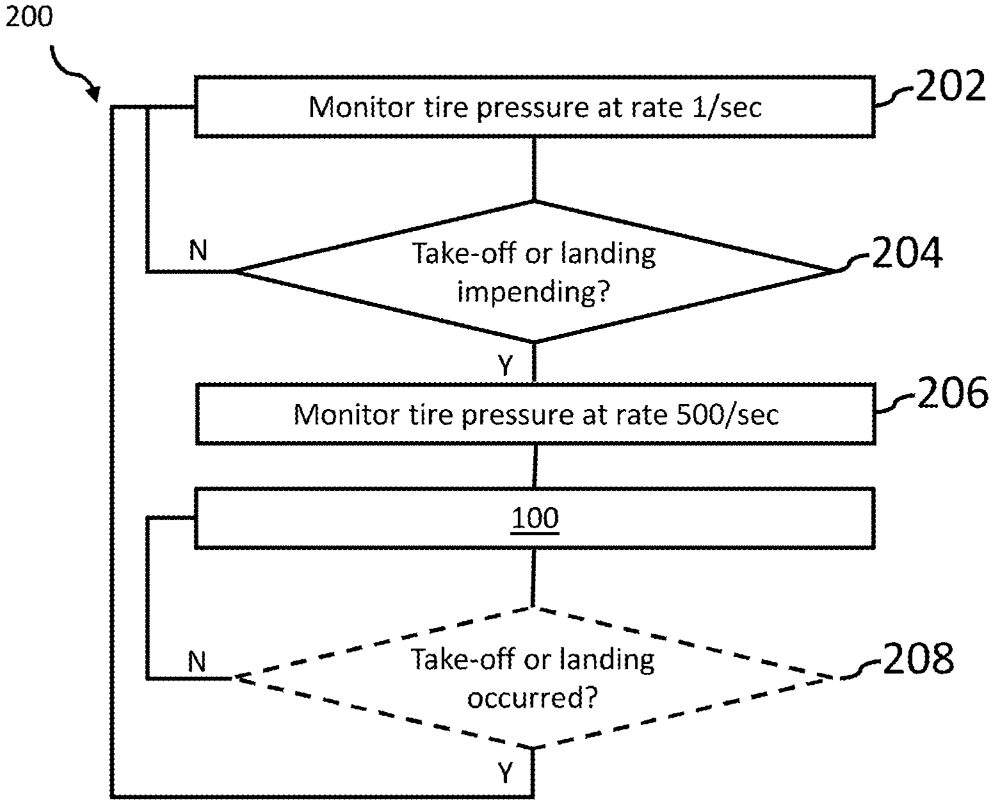
FIG. 7 shows a second method according to an example.

FIG. 7 shows a second method 200 according to an example. The second method 200 comprises monitoring pressure in a tire of a wheel of an aircraft at a detection rate of around 1 measurement per second (block 202), determining whether an aircraft take-off or landing event is impending (block 204) and, in the event that aircraft take-off or landing event is impending, monitoring pressure in a tire of a wheel of an aircraft at a detection rate of around five hundred measurements per second at least until the aircraft take-off or landing event has occurred (block 206). The second method 200 further comprises performing the first method 100 of FIG. 6 whilst monitoring pressure in the tire of the wheel of an aircraft at a detection rate of around five hundred measurements per second.

The second method 200 comprises determining whether an aircraft take-off is impending (block 204) on the basis of a signal indicative of one or more of: a rotational speed of the wheel, an acceleration of the aircraft, the aircraft exceeding a threshold aircraft speed, temperature in the tire increasing by a threshold amount indicative of aircraft taxiing and/or acceleration, pressure in the tire increasing by a threshold amount indicative of aircraft taxiing and/or acceleration.

The second method 200 comprises determining whether an aircraft landing is impending (block 204) on the basis of a signal indicative of one or more of: a landing gear of the aircraft being locked in an extended position, aircraft speed, aircraft altitude, a position of one or more flaps of the aircraft.

The second method 200 further comprises determining whether the aircraft take-off or landing event has occurred (block 208) and, on the basis of determining that the aircraft take-off or landing event has occurred, monitoring pressure in a tire of a wheel of an aircraft at a detection rate of around 1 measurement per second (block 202).

Figure 8:
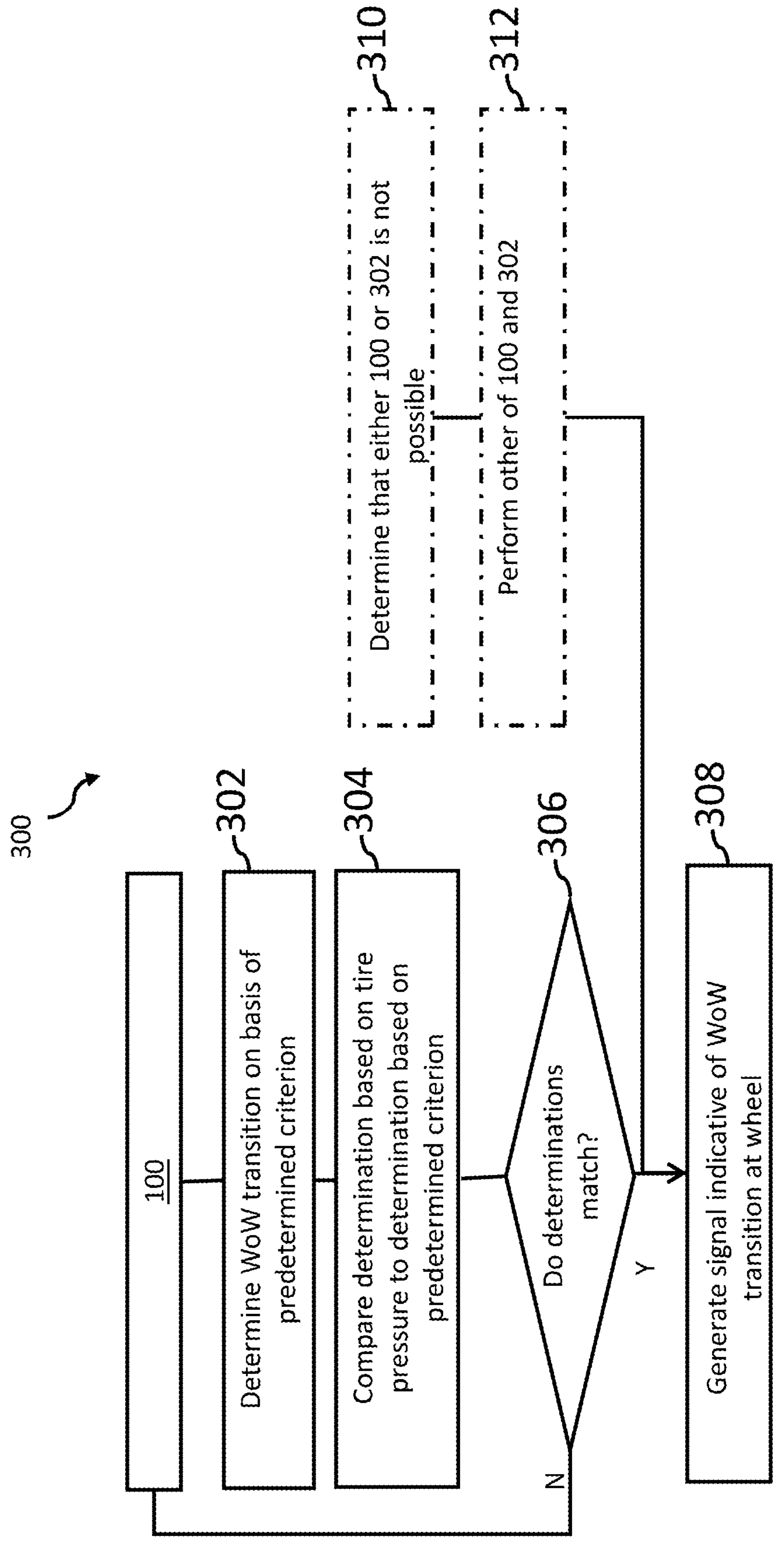
FIG. 8 shows a third method according to an example.

FIG. 8 shows a third method 300 according to an example. The third method 300 comprises the second method 200 of FIG. 7, but in other examples the third method 300 comprises the first method 100 instead. The third method 300 further comprises determining whether a transition between Weight on Wheels and Weight off Wheels has occurred at the wheel on the basis of a predetermined criterion, wherein the predetermined criterion does not comprise pressure in the tire (block 302), comparing the determination based on pressure in the tire to the determination based on the predetermined criterion (block 304), determining whether the determination based on pressure in the tire matches the determination based on the predetermined criterion (block 306) and generating a signal indicative that a transition between Weight on Wheels and Weight off Wheels has occurred at the wheel only in the event that both the determination on the basis of pressure in the tire and the determination on the basis of the predetermined criterion determine that a transition between Weight on Wheels and Weight off Wheels has occurred at the wheel (block 308).

The predetermined criterion comprises one or more of: a distance between a predefined point on the aircraft and the ground, a change in strut length of a strut of a landing gear of the aircraft, a change in rotational speed of the wheel, and a deflection of the tire.

The third method 300 further comprises detecting that the determining is not possible on the basis of one of the predetermined criterion and pressure in the tire (block 310), and performing the determining on the basis of the other of the predetermined criterion and pressure in the tire (block 312). In this example, detecting that the determining is not possible on the basis of one of the predetermined criterion and pressure in the tire is performed on the basis of a failure signal from either a system to detect pressure in the tire or a system to detect the predetermined criterion. In the event that the determining is not possible on the basis of one of the predetermined criterion and pressure in the tire, the method 300 comprises generating the signal (block 308) on the basis of the determining of block 310.

Figure 9:
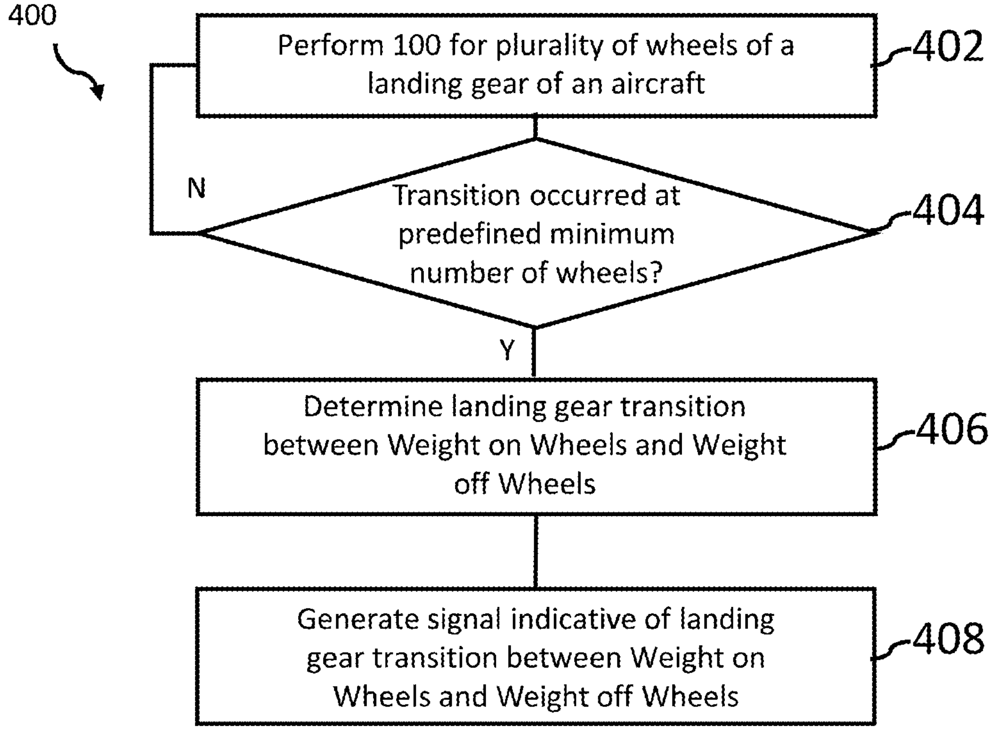
FIG. 9 shows a fourth method according to an example.

FIG. 9 shows a fourth method 400 according to an example. The fourth method 400 comprises performing the first method 100 for a plurality of wheels of a landing gear of the aircraft (block 402), determining whether a transition between Weight on Wheels and Weight off Wheels has occurred at a predefined minimum number of the plurality of wheels (block 404), determining that the landing gear has transitioned between Weight on Wheels and Weight off Wheels in response to determining that a transition between Weight on Wheels and Weight off Wheels has occurred at the predefined minimum number of the plurality of wheels (block 406), and generating a signal indicative that the landing gear has transitioned between Weight on Wheels and Weight off Wheels (block 408). Each wheel of the plurality of wheels has a pressure that is above a minimum pressure, such that underinflated tires are not considered in determining whether the landing gear has transitioned between Weight on Wheels and Weight off Wheels.

Figure 10:
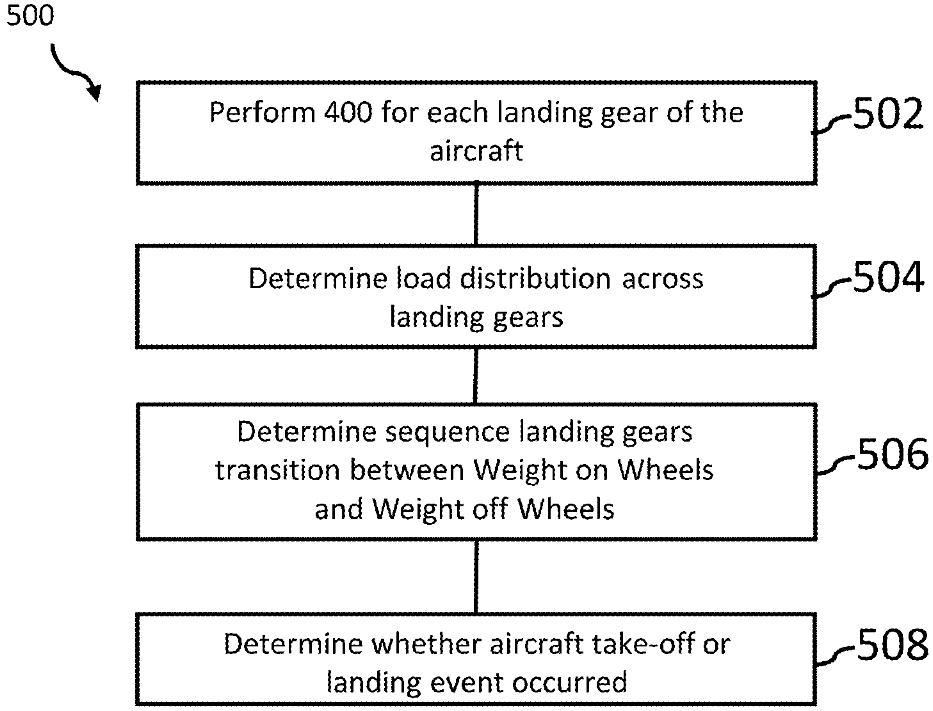
FIG. 10 shows a fifth method according to an example.

FIG. 10 shows a fifth method 500 according to an example. The fifth method 500 comprises performing the fourth method 400 for each landing gear of the aircraft (502), and determining, on the basis of determining which wheels of the aircraft have transitioned between Weight on Wheels and Weight off Wheels, a load distribution of the aircraft across the landing gears of the aircraft (block 504). The fifth method 500 further comprises determining a sequence in which the landing gear of the aircraft of transition between Weight on Wheels and Weight off Wheels (block 506), and, on the basis of the sequence determined, determining whether an aircraft take-off event or an aircraft landing event has occurred or is occurring (block 508).

Figure 11:
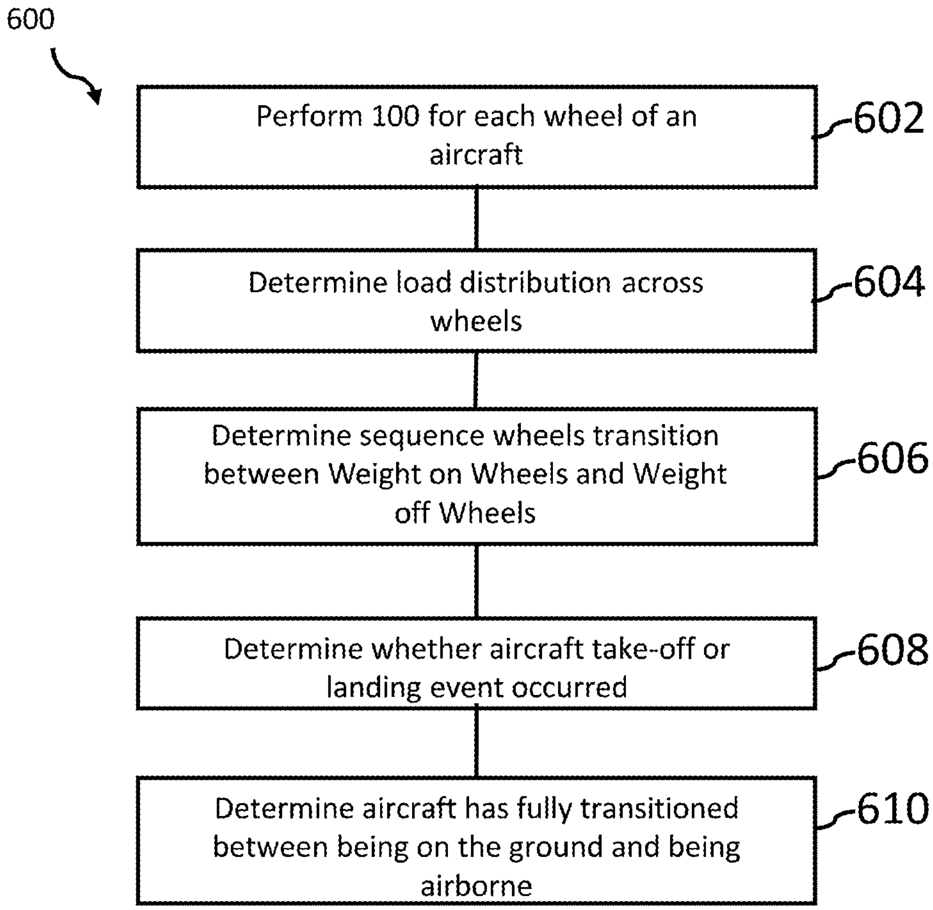
FIG. 11 shows a sixth method according to an example.

FIG. 11 shows a sixth method 600 according to an example. The sixth method 600 comprises performing the first method 100 for each wheel of the aircraft (602), and determining, on the basis of determining which wheels of the aircraft have transitioned between Weight on Wheels and Weight off Wheels, a load distribution of the aircraft across the wheels of the aircraft (block 604). The sixth method 600 further comprises determining a sequence in which the wheels of the aircraft of transition between Weight on Wheels and Weight off Wheels (block 606), and, on the basis of the sequence determined, determining whether an aircraft take-off event or an aircraft landing event has occurred or is occurring (block 608). The sixth method 600 further comprises determining, on the basis of determining that all of the wheels of the aircraft have transitioned between Weight on Wheels and Weight off Wheels, that the aircraft has fully transitioned between being on the ground and being airborne (block 610).

It will be appreciated that each of the methods 100-600 may comprise generating respective signals indicative of any determination of the method and transmitting the signal to an appropriate system of the aircraft and/or to a maintenance system associated with the aircraft. The appropriate system of the aircraft and/or the maintenance system associated with the aircraft comprise a machine learning model and the respective signals are used to update the machine learning model.

It will be appreciated that some aspects of the methods 100-600 may be omitted without departing from the scope of the invention. Such aspects are shown, by way of example only, with dashed lines in the Figures.

With respect to any of the methods 100-600, the aircraft may be the aircraft 1 discussed herein with reference to FIGS. 1 to 3, and the methods 100-600 may be performed, at least in part, by the WoW system 30 of the aircraft 1. In this example, the aircraft 1 comprises a non-transitory storage medium 60 and a processor 62, the non-transitory storage medium 60 storing machine-readable instructions which, when executed by the processor 62, cause the processor 62 to initiate any one of the methods 100-600 disclosed herein.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

It is to be noted that the term “or” as used herein is to be interpreted to mean “and/or”, unless expressly stated otherwise.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms “comprise” or “comprising” do not exclude other elements or steps, the terms “a” or “one” do not exclude a plural number, and the term “or” means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A computer-implemented method comprising:

determining, by a controller of an aircraft receiving pressure data from a tire pressure monitoring system during operation of the aircraft, and based on a temporal behavior of the pressure data corresponding to a change in load supported by a wheel of the aircraft, on a basis of a change in a pressure in a tire of a wheel of an aircraft, whether a transition between Weight on Wheels and Weight off Wheels has occurred at the wheel; and outputting, to one or more systems of the aircraft, a signal indicative of the transition for use in controlling operation of the aircraft.

2. The computer-implemented method according to claim 1, wherein the determining comprises determining that a transition from Weight on Wheels to Weight off Wheels has occurred at the wheel on the basis of a decrease in the pressure in the tire.

3. The computer-implemented method according to claim 1, wherein the determining comprises determining that a transition from Weight off Wheels to Weight on Wheels has occurred on the basis of an increase in the pressure in the tire.

4. The computer-implemented method according to claim 1, wherein the change in the pressure is at least a 1% change in the pressure in the tire in a time of no more than 0.5 seconds.

5. The computer-implemented method according to claim 1 further comprising:

in response to determining that a transition from Weight on Wheels to Weight off Wheels has occurred at the wheel, at least one of:

causing a landing gear control system of the aircraft to initiate retraction of a landing gear comprising a landing gear wheel;

issuing an alert indicative of a transition from Weight on Wheels to Weight off Wheels at the wheel to one or more systems of the aircraft, or one or more systems remote from the aircraft, or both; and storing, in a memory, data indicative of the change in the pressure of the tire during the transition from Weight on Wheels to Weight off Wheels at the wheel.

6. The computer-implemented method according to claim 1 further comprising:

in response to determining that a transition from Weight off Wheels to Weight on Wheels has occurred at the wheel, at least one of:

causing a braking system of the aircraft to initiate aircraft braking;

issuing an alert indicative of transition from Weight off Wheels to Weight on Wheels at the wheel to one or more systems of the aircraft, or one or more systems remote from the aircraft, or both; and storing, in a memory, data indicative of the change in the pressure of the tire during the transition from Weight off Wheels to Weight on Wheels at the wheel.

7. The computer-implemented method according to claim 1 further comprising:

additionally determining whether a transition between Weight on Wheels and Weight off Wheels has occurred at the wheel on a basis of a predetermined criterion, wherein the predetermined criterion is different from the pressure in the tire and is indicative that a transition between Weight on Wheels and Weight off Wheels has occurred at the wheel.

8. The computer-implemented method according to claim 1 further comprising:

measuring the pressure in the tire at a first frequency of detection;

detecting, on the basis of a predetermined criterion, an impending aircraft take-off or aircraft landing event; and, in response detecting an impending aircraft take-off or aircraft landing event, measuring the pressure at a second frequency of detection, higher than the first frequency of detection.

9. The computer-implemented method according to claim 1 further comprising:

in response to determining that a transition from Weight off Wheels to Weight on Wheels has occurred at the wheel:

determining a maximum impact force on the wheel as the transition from Weight off Wheels to Weight on Wheels occurred at the wheel;

determining, on a basis of the change in the pressure in the tire and the determined maximum impact force, a descent rate of the aircraft; and determining whether the determined descent rate of the aircraft exceeds a threshold descent rate.

10. The computer-implemented method according to claim 9 further comprising:

in response to determining that the determined descent rate of the aircraft exceeds the threshold descent rate, at least one of:

storing the determined descent rate in a memory; and issuing an alert indicative that the determined descent rate of the aircraft exceeds the threshold descent rate.

11. The computer-implemented method according to claim 1 further comprising:

determining whether a transition between Weight on Wheels and Weight off Wheels has occurred for a plurality of wheels of a landing gear of the aircraft, wherein the determination for each wheel is a basis of a change in a pressure in a tire of the wheel, and determining, in response to determining that a transition between Weight on Wheels and Weight off Wheels has occurred at each of the plurality of wheels, that the landing gear has transitioned between Weight on Wheels and Weight off Wheels.

12. The computer-implemented method of claim 1, wherein a determination is made for each wheel of the aircraft, the method comprising:

determining, on the basis of determining which wheels of the aircraft have transitioned between Weight on Wheels and Weight off Wheels, a load distribution of the aircraft across the wheels of the aircraft.

13. A controller for an aircraft, wherein the controller is configured to:

receive pressure data from a tire pressure monitoring system indicative of a pressure in a tire of a wheel of the aircraft during operation of the aircraft;

determine, based on temporal behavior of the pressure data corresponding to a change in load supported by the wheel, on a basis of a change in the pressure in the tire, whether a transition between Weight on Wheels and Weight off Wheels has occurred at the wheel; and output, to one or more systems of the aircraft, a signal indicative of the transition for use in controlling operation of the aircraft.

14. A system for an aircraft, the system comprising:

a tire pressure monitoring system configured to detect a pressure in a tire of a wheel of the aircraft and output pressure data indicative of the pressure detected; and a controller configured to receive the pressure data from the tire pressure monitoring system during operation of the aircraft and determine, based on temporal behavior of the pressure data corresponding to a change in load supported by the wheel and on a basis of change in pressure of the tire, whether a transition between Weight on Wheels and Weight off Wheels has occurred at the wheel, and output, to one or more aircraft systems, a signal indicative of the transition for use in controlling operation of the aircraft.

15. The system according to claim 14, wherein the tire pressure monitoring system comprises an analogue sensor configured to sense the pressure in the tire, and the signal is indicative of pressure sensed by the analogue sensor.

16. The system according to claim 14, wherein the controller is configured to cause the tire pressure monitoring system to detect the pressure in the tire at a first detection rate, and to increase a detection rate to a second detection rate in response to a determination by the controller, on the basis of a predetermined criterion, of an impending aircraft take-off or aircraft landing event.

17. The system according to claim 14, wherein the system is configured to output a signal to another aircraft system, the signal indicative that a transition between Weight on Wheels and Weight off Wheels has occurred at the wheel.

18. The system according to claim 14, wherein the tire pressure monitoring system is configured to detect pressure in a tire of each wheel of the aircraft and to output respective signals indicative of the pressure detected in each tire, and wherein the controller is configured to determine whether a transition between Weight on Wheels and Weight off Wheels has occurred at each wheel, on a basis of the respective signal indicative of the pressure detected in the respective tire.

19. A non-transitory storage medium configured to store machine readable instructions which, when executed by a processor, cause the processor to initiate the method according to claim 1.

20. An aircraft comprising: the non-transitory storage medium according to claim 19.

* * * * *